(12) United States Patent
Byrne et al.

(10) Patent No.: US 10,811,809 B2
(45) Date of Patent: Oct. 20, 2020

(54) ELECTRICAL POWER AND DATA UNIT

(71) Applicants: Norman R. Byrne, Ada, MI (US); Joseph D. Ward, Grand Rapids, MI (US)

(72) Inventors: Norman R. Byrne, Ada, MI (US); Joseph D. Ward, Grand Rapids, MI (US)

(*) Notice: Subject to any disclaimer, the term of this patent is extended or adjusted under 35 U.S.C. 154(b) by 0 days.

(21) Appl. No.: 16/255,380

(22) Filed: Jan. 23, 2019

(65) Prior Publication Data

US 2019/0229458 A1 Jul. 25, 2019

Related U.S. Application Data

(60) Provisional application No. 62/621,575, filed on Jan. 24, 2018.

(51) Int. Cl.

| | |
|---|---|
| *H01R 13/66* | (2006.01) |
| *H01R 13/518* | (2006.01) |
| *H01H 9/02* | (2006.01) |
| *H01R 13/512* | (2006.01) |
| *H01R 27/02* | (2006.01) |
| *H02G 3/08* | (2006.01) |
| *H01R 107/00* | (2006.01) |
| *H01R 24/62* | (2011.01) |
| *H01R 24/78* | (2011.01) |
| *H01R 25/00* | (2006.01) |

(52) U.S. Cl.
CPC ............. *H01R 13/518* (2013.01); *H01H 9/02* (2013.01); *H01R 13/512* (2013.01); *H01R 27/02* (2013.01); *H02G 3/086* (2013.01); *H01R 24/62* (2013.01); *H01R 24/78* (2013.01); *H01R 25/006* (2013.01); *H01R 2107/00* (2013.01)

(58) Field of Classification Search
CPC ...... H01H 9/02; H01H 13/518; H01H 13/512; H01H 24/62; H01H 24/78; H01H 25/006; H01H 27/02; H01H 2107/00
USPC .......................................... 439/535, 536, 638
See application file for complete search history.

(56) References Cited

U.S. PATENT DOCUMENTS

| | | | |
|---|---|---|---|
| 1,300,265 A | 4/1919 | Handley | |
| 1,909,270 A | 5/1933 | Guett | |
| 3,851,226 A | 11/1974 | Chen | |
| 5,122,069 A * | 6/1992 | Brownlie | G02B 6/4451 174/53 |
| D367,038 S | 2/1996 | Fladung et al. | |
| D367,643 S | 3/1996 | Vardell | |
| 5,516,298 A * | 5/1996 | Smith | A47B 21/06 439/131 |

(Continued)

*Primary Examiner* — Khiem M Nguyen
(74) *Attorney, Agent, or Firm* — Gardner, Linn, Burkhart & Ondersma LLP

(57) ABSTRACT

An electrical power and/or electronic data unit is assembled from interchangeable and configurable components to facilitate manufacturing for customized applications. The unit includes a main housing that may have a substantially constant cross-section between two open ends, and may be formed by an extrusion process. The main housing includes at least one sidewall surrounding an internal volume between the open ends, while first and second cover plates enclose the open ends. At least one of the cover plates typically supports an electrical component such as an electronic data outlet, an electrical power outlet, or an electrical switch.

20 Claims, 4 Drawing Sheets

(56) References Cited

U.S. PATENT DOCUMENTS

| | | |
|---|---|---|
| 5,575,668 A | 11/1996 | Timmerman |
| 6,220,880 B1 * | 4/2001 | Lee ..................... H01R 25/003 |
| | | 439/214 |
| 6,492,591 B1 | 12/2002 | Metcalf |
| 6,740,810 B1 | 5/2004 | Regueiro |
| 6,793,524 B2 * | 9/2004 | Clark ................... H01R 13/518 |
| | | 439/536 |
| 6,830,477 B2 | 12/2004 | Vander Vorste et al. |
| D535,257 S | 1/2007 | Byrne |
| D537,039 S | 2/2007 | Pincek |
| D537,785 S | 3/2007 | Pincek |
| D568,817 S | 5/2008 | Yu |
| 7,432,439 B2 | 10/2008 | Takada et al. |
| 7,736,178 B2 * | 6/2010 | Byrne ..................... G06F 1/266 |
| | | 439/527 |
| D622,219 S | 8/2010 | Byrne |
| D626,069 S | 10/2010 | Byrne |
| D626,070 S | 10/2010 | Byrne |
| D626,071 S | 10/2010 | Su et al. |
| D636,728 S | 4/2011 | Terleski et al. |
| D639,244 S | 6/2011 | Byrne |
| D642,529 S | 8/2011 | Su et al. |
| 8,033,867 B1 | 10/2011 | Kessler et al. |
| D649,514 S | 11/2011 | Byrne |
| D653,215 S | 1/2012 | Lam |
| D660,237 S | 5/2012 | Byrne |
| D665,355 S | 8/2012 | Byrne |
| D666,556 S | 9/2012 | Byrne |
| 8,277,233 B2 | 10/2012 | Su |
| D673,912 S | 1/2013 | Benedetti |
| D680,953 S | 4/2013 | Kuo |
| D682,213 S | 5/2013 | Byrne et al. |
| D682,789 S | 5/2013 | Au |
| 8,444,432 B2 | 5/2013 | Byrne et al. |
| 8,480,429 B2 | 7/2013 | Byrne |
| D693,306 S | 11/2013 | Chuang et al. |
| D695,693 S | 12/2013 | Lee et al. |
| D698,314 S | 1/2014 | Byrne et al. |
| 8,625,255 B2 | 1/2014 | Linnane et al. |
| 8,690,590 B2 | 4/2014 | Byrne |
| 8,736,106 B2 | 5/2014 | Byrne et al. |
| D714,726 S | 10/2014 | Byrne et al. |
| D715,225 S | 10/2014 | Mininger et al. |
| D719,091 S | 12/2014 | Leddusire |
| D721,330 S | 1/2015 | Byrne et al. |
| D721,653 S | 1/2015 | Lee et al. |
| D722,563 S | 2/2015 | Byrne et al. |
| 9,000,298 B2 | 4/2015 | Byrne et al. |
| D730,834 S | 6/2015 | Byrne et al. |
| D730,836 S | 6/2015 | Lee et al. |
| D736,159 S | 8/2015 | Byrne et al. |
| D736,709 S | 8/2015 | Byrne et al. |
| D739,355 S | 9/2015 | D'Aubeterre |
| D740,228 S | 10/2015 | Page et al. |
| D740,229 S | 10/2015 | Page et al. |
| D744,951 S | 12/2015 | Oosterman et al. |
| 9,246,317 B2 | 1/2016 | Byrne et al. |
| D751,038 S | 3/2016 | Lin |
| D752,517 S | 3/2016 | Scott et al. |
| 9,312,653 B2 | 4/2016 | Byrne et al. |
| 9,312,673 B2 | 4/2016 | Byrne et al. |
| D755,128 S | 5/2016 | Page et al. |
| D755,129 S | 5/2016 | Page et al. |
| 9,368,924 B2 | 6/2016 | Byrne et al. |
| D765,033 S | 8/2016 | Oosterman et al. |
| 9,425,570 B2 | 8/2016 | Oosterman et al. |
| D775,077 S | 12/2016 | Xu |
| D775,080 S | 12/2016 | Newhouse |
| D775,589 S | 1/2017 | Soffer et al. |
| D776,056 S | 1/2017 | Block et al. |
| 9,601,860 B2 | 3/2017 | Byrne et al. |
| 9,627,873 B2 | 4/2017 | Makwinski et al. |
| D788,039 S | 5/2017 | Page et al. |
| 9,640,960 B2 | 5/2017 | Makwinski et al. |
| 9,661,768 B2 | 5/2017 | Haw |
| 9,706,833 B2 | 7/2017 | Newhouse |
| 9,755,385 B1 | 9/2017 | Kondas |
| D798,818 S | 10/2017 | Kondas |
| D799,428 S | 10/2017 | Kondas |
| D801,276 S | 10/2017 | Lin |
| D801,936 S | 11/2017 | Rose |
| D801,937 S | 11/2017 | Rose |
| D804,419 S | 12/2017 | Hayes et al. |
| D807,297 S | 1/2018 | Byrne et al. |
| D807,298 S | 1/2018 | Xu |
| D807,829 S | 1/2018 | Byrne et al. |
| D807,831 S | 1/2018 | Xu |
| D808,339 S | 1/2018 | Page et al. |
| D811,337 S | 2/2018 | Byrne et al. |
| D811,338 S | 2/2018 | Zhu |
| 9,887,500 B2 | 2/2018 | Riner |
| D812,009 S | 3/2018 | Hayes et al. |
| 10,367,317 B1 * | 7/2019 | Rahner ................ H01R 25/003 |
| 2004/0121648 A1 * | 6/2004 | Voros ................. H01R 13/6215 |
| | | 439/535 |
| 2015/0303821 A1 | 10/2015 | Lee et al. |

* cited by examiner

ELECTRICAL POWER AND DATA UNIT

CROSS REFERENCE TO RELATED APPLICATION

The present invention hereby incorporates herein by reference in its entirety U.S. provisional application Ser. No. 62/621,575, filed Jan. 24, 2018.

FIELD OF THE INVENTION

The present invention relates to electrical power and/or electronic data distribution systems for use in work areas and the like.

BACKGROUND OF THE INVENTION

The need or desire to incorporate electrical power outlets in different locations has increased as portable electronic devices such as mobile phones, portable media players, and the like have proliferated, since these devices often require frequent charging of onboard batteries. Such devices typically require access to either low voltage (e.g., 2V DC to 12V DC) power outlets, or high voltage (e.g., 110V AC or 220V AC) power outlets together with a DC power converter. However, typical extension cords and the like are manufactured with a fixed configuration of electrical outlet and/or electronic data outlet, and can only be used for the limited purpose for which it was manufactured.

SUMMARY OF THE INVENTION

The present invention provides an electrical power and/or electronic data distribution unit with high voltage AC (e.g. 110V or 220V) and/or low voltage DC (e.g., 2V DC to 12V DC) electrical outlets positioned at one or more sides thereof. The electrical or electronic outlets may be replaced or changed as desired, and outlets can be added or subtracted from the unit by changing one or both of two replaceable cover plates, having a desired number and/or type of mounting locations for a desired application. A midsection of the unit may have a substantially constant cross-section and may be made via extrusion, for example, and can accept different numbers and types of outlets according to the cover plates that are fitted to opposite open sides of the midsection.

According to one form of the present invention, an electrical power and/or electronic data unit includes a main housing with open ends opposite one another, and a cover plate removably attached over each opposite end. The main housing cooperates with the open ends to define an internal volume. The first cover plate defines a first opening where an electrical component is secured via engagement of outer surfaces of the electrical component with surfaces of the first cover plate that define the first opening.

According to another form of the present invention, an electrical power and/or electronic data unit includes a main housing with open ends opposite one another, and having a substantially constant cross section extending between the open ends. The main housing is made up of four sidewalls in a rectangular arrangement, and four enlarged corner elements coupling the sidewalls together to define an internal volume. Each corner element has opposite ends adjacent the respective open ends of the main housing, and each corner element has a mechanical connection element at each end thereof, for coupling the cover plates to the main housing. The first cover plate defines an opening for receiving an electrical component, such as an electrical power or electronic data outlet, or a switch.

Thus, the electrical power and/or electronic data unit is readily adaptable to support different types, sizes, quantities of electrical or electronic components, such as for use in a work area. The units can be readily customized during assembly without need for a large number of differently configured components, and can even be modified after assembly to support different types of components if needs change.

These and other objects, advantages, purposes and features of the present invention will become apparent upon review of the following specification in conjunction with the drawings.

DESCRIPTION OF THE PREFERRED EMBODIMENTS

Figure 1:
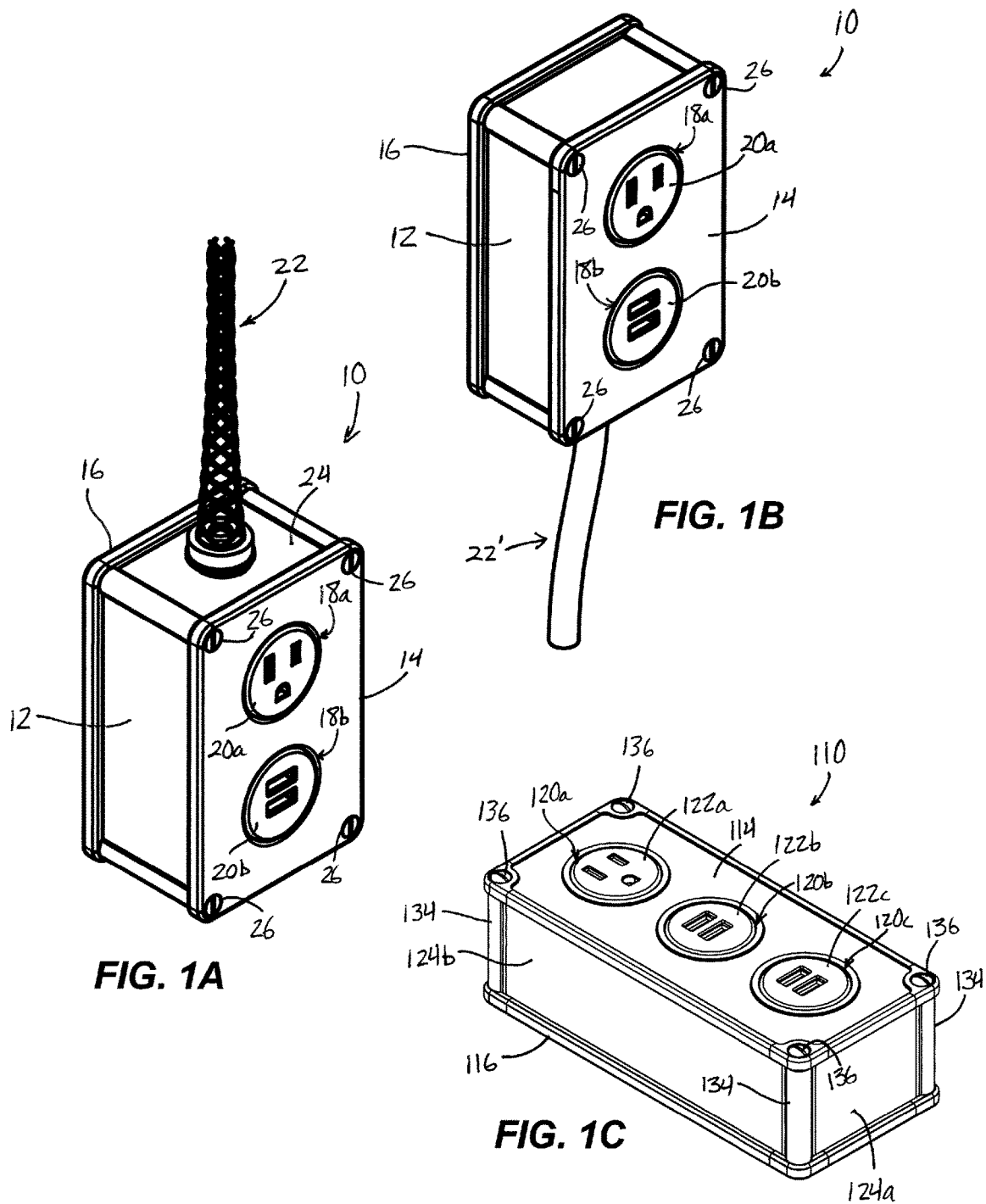
FIGS. 1A-1C are perspective views of electrical power and data units in accordance with the present invention.

Referring now to the drawings and the illustrative embodiments depicted therein, an electrical power and/or data unit 10 includes a main housing or midsection 12 that is fitted with a first cover plate 14 and a second cover plate 16 opposite the first cover plate 14 to define a generally rectangular internal volume, such as shown in FIGS. 1A and 1B. In the illustrated embodiment of FIGS. 1A and 1B, the first cover plate 14 defines a pair of round openings 18a, 18b for receiving and supporting respective round electrical outlets 20a, 20b. The first electrical outlet 20a is illustrated as a high voltage AC simplex electrical outlet, and the second electrical outlet 20b is illustrated as a low voltage DC electrical outlet having two USB-A style receptacle openings. The electrical power or data unit 10 is assembled from interchangeable parts, and the main housing 12 can be readily formed to different depth dimensions, which facilitates customization of each unit without the significantly higher costs of higher parts counts that might otherwise be required for such customization.

A high voltage AC power cord 22, 22' enters main housing 12 through an end wall 24 of the main housing 12, and supplies electrical power to both electrical outlets 20a, 20b. It will be appreciated that an AC-to-DC electrical power converter may be mounted inside main housing 12 for supplying low voltage DC electrical power to the low voltage second electrical outlet 20b. Power cords 22, 22' may receive electrical power from a conventional wall or floor outlet (not shown), or from an electrical mains connection (not shown). In the embodiment of FIG. 1A, the power cord 22 is wrapped in an abrasion-resistant woven fiber, while in the embodiment of FIG. 1B the power cord 22' has a more conventional rubber or rubber-like sleeve or jacket providing a similar function, covering the individual electrical conductors contained therein. The power cords 22, 22' and the manner in which they are mounted to the main housings 12 may be appropriate for overhead mounting arrangements in which the unit 10 is suspended from the cord, which is secured in an overhead location.

The first and second cover plates 14, 16 are be removably secured to the main housing 12 via threaded fasteners 26 at each of four corners, as shown in FIG. 1. However, it will be appreciated that the cover plates could be secured with resilient latches, adhesives, rivets, welds, or the like. As will be described in more detail below, the cover plates 14, 16 may be interchangeable with one another, or with other cover plates having different configurations, in order to support a desired number and type of electrical and/or electronic data outlets.

Figure 2:
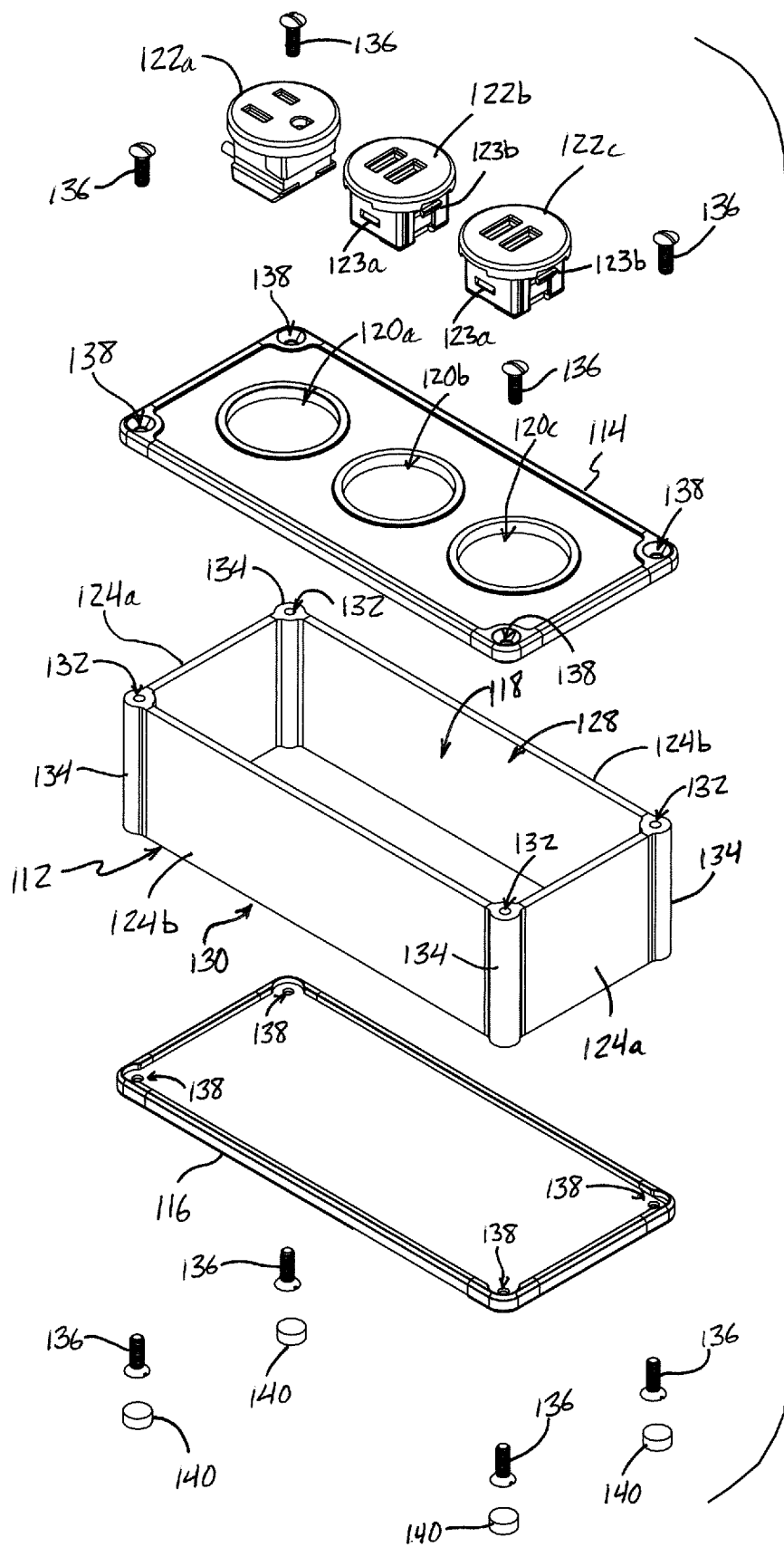
FIG. 2 is an exploded perspective view of the electrical power and data unit of FIG. 1C.

Referring now to FIGS. 1C and 2, another electrical power and/or data unit 110 has a substantially constant generally rectangular cross-section main housing or midsection 112, which may be identical to the main housing or midsection 12 of power and data unit 10. It will be appreciated that when the cross-section of main housing 112 is described as being "substantially constant," it is intended that the housing is at least initially formed in a manner that results in a constant cross section within normal manufacturing tolerances, and that later operations such as drilling and threading of bores, or the like, may be performed while still considering the resulting cross-section to be substantially constant despite the subsequent modifications.

Main housing 112 can be fitted with a generally rectangular first cover plate 114 and a generally rectangular second cover plate 116 opposite the first cover plate 114 to define a generally rectangular internal volume 128 (FIG. 2). The first cover plate 114 defines three circular openings 120a-c for receiving and supporting respective circular electrical outlets 122a-c. The first electrical outlet 122a is illustrated as a high voltage AC simplex electrical outlet, and the second and third electrical outlets 122b, 122c are illustrated as low voltage DC electrical outlets each having two USB-A style receptacle openings. However, it will be appreciated that other types of electrical power and/or electronic data outlets may be accommodated, and that throughout the description and claims, unless otherwise stated the terms "electrical outlet" or "electrical receptacle" may be used interchangeably to refer to any such outlets for power and/or electronic data transmission.

A high voltage AC power cord (not shown in FIG. 1C or 2) may enter main housing 112 through an end wall 124a or a side wall 124b thereof, and supplies electrical power to all of the electrical outlets 122a-c, with an AC-to-DC electrical power converter provided as needed. It will be appreciated that, in the case of electronic data outlets, a suitable signal cable or cord may be provided to the housing 112, and may be shielded and/or routed separately from an electrical power cord as appropriate.

The electrical receptacles 122a-c are retained in the respective openings 120a-c via engagement of outer surfaces 126 of the receptacles 122a-c (which may include ridges 123a or latching elements 123b, or other outwardly-extending features) with surfaces of the first cover plate 114 that define the respective openings 120a-c. Such interfaces are more clearly and thoroughly illustrated and described, for example, in commonly-owned U.S. Pat. No. 9,748,709, which is hereby incorporated herein by reference in its entirety. However, it is further envisioned that standard simplex and/or duplex outlets may be fitted to correspondingly shaped openings in either of the cover plates 114, 116, and secured with threaded fasteners, latch tabs, or any suitable connection, without departing from the spirit and scope of the present invention. Therefore, electrical receptacles 122a-c may be wholly secured and retained via their engagement with the first cover plate 114, such that main housing 112 primarily serves to contain and protect the receptacles' rear housing portions (including outer surfaces 126 and internal structure) along with supporting, strain-relieving, and protecting the corresponding wiring of the receptacles 122a-c.

First cover plate 114 and second cover plate 116 are interchangeable, and in the embodiment of FIGS. 1C and 2 the first cover plate 114 is positioned to be secured to an open first end 128 of main housing 112, while the second cover plate 116 is positioned to be secured to an open second end 130 of main housing 112 that is opposite the open first end 128. Because main housing 112 is formed with a constant cross-section, it can be formed as an extrusion and cut to a desired depth (the spacing between first end 128 and second end 130) to provide a desired spacing and interior volume 118 between first and second cover plates 114, 116. Optionally, main housing 112 can be molded or otherwise formed in any suitable manner to the final desired shape.

A threaded bore 132 at each corner 134 of the main housing 112, adjacent each of the open first and second ends 128, 130, allows respective threaded fasteners 136 to be used to secure each cover plate 114, 116 (each with its own fastener bore 138 at each corner) to a respective open end 128, 130 of the main housing 112. As best shown in FIG. 2, the main housing's end walls 124a and side walls 124b are substantially planar constant-thickness walls, while corners 134 are enlarged and semi-cylindrical to provide sufficient material to accommodate the threaded bores 132. Optionally anti-skid pads 140 are placed along a desired cover plate 114, 116 (second cover plate 116, shown) so that the electrical power and/or data unit 110 can be rested along a table or floor or other support surface, on the pads 140, without marring the support surface, and optionally increasing the frictional engagement of the unit 110 with the support surface.

It will be appreciated that either cover plate 114, 116 may have substantially any desired number and shape or configuration of outlet openings, to accommodate substantially any number and/or type of electrical outlets that may fit a given size of main housing 112. Thus, the electrical power and/or data unit 110 may be one-sided as shown in FIG. 2, or may be two-sided simply by substituting a different cover plate for the no-opening second cover plate 116 that is shown in FIG. 2. It is envisioned that end users may be permitted to change cover plates and outlets as desired, in order to customize and subsequently change the configuration of the electrical power and/or data unit 110 for their desired purposes. Optionally, multiple cover plates having different configurations and multiple different outlets may be provided, such as in kit form, to permit the end user to select and set up the desired configuration.

Figure 2A:
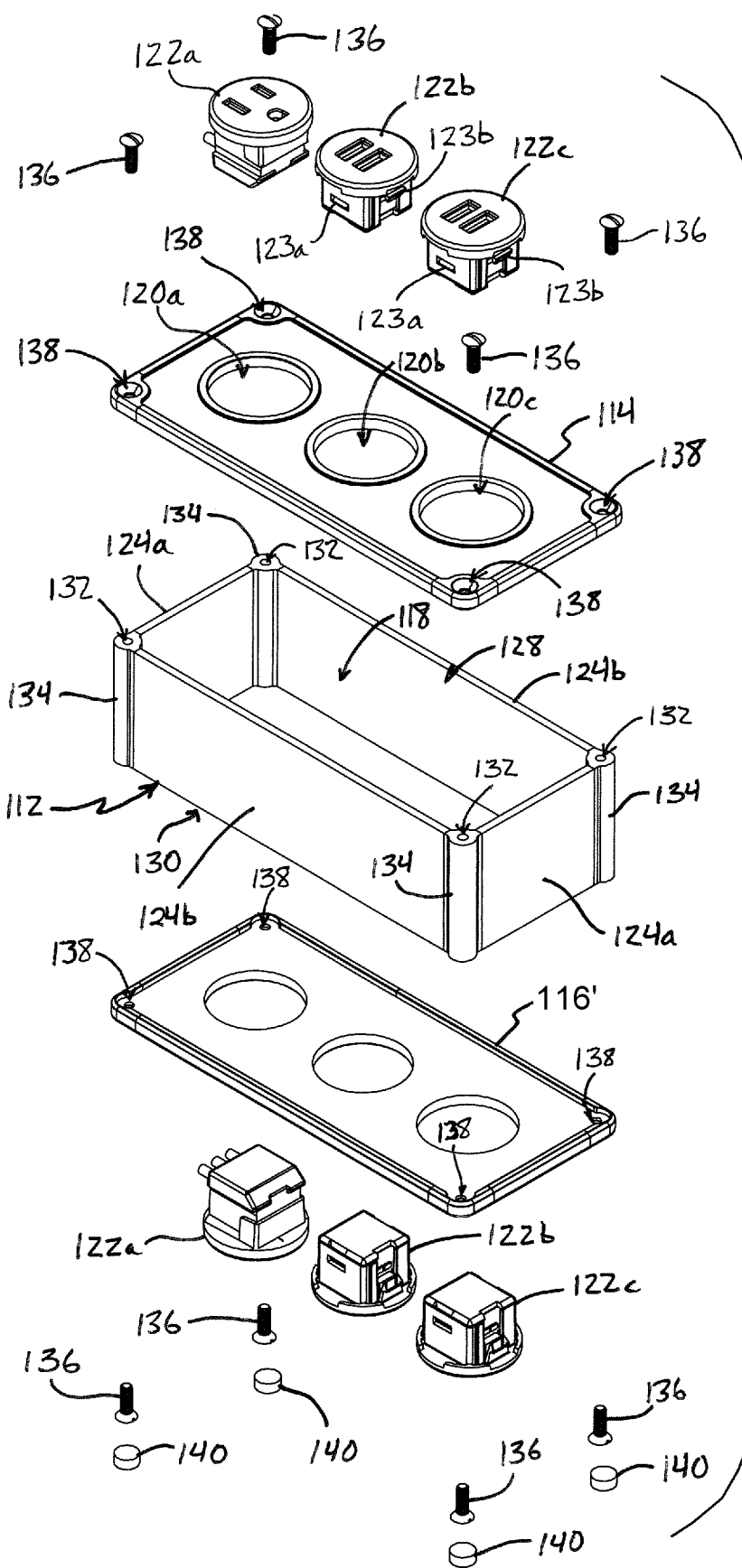
FIG. 2A is an exploded perspective view of a two-sided electrical power and data unit.

When both cover plates are fitted with outlets as shown in FIG. 2A, the outlets on the first cover plate 114 will face in the opposite direction from the outlets on the second cover plate 116', such that only one set of outlets on one cover plate may be useable if the other cover plate is facing downwardly and resting on a support surface. Optionally, additional openings may be formed in either of the end walls 124a and/or either of the side walls 124b to provide space for additional outlets, provided that there is sufficient space inside the interior volume 118 and clearance for the associated wiring, AC-to-DC converter (if needed), and the like.

Figure 3A:
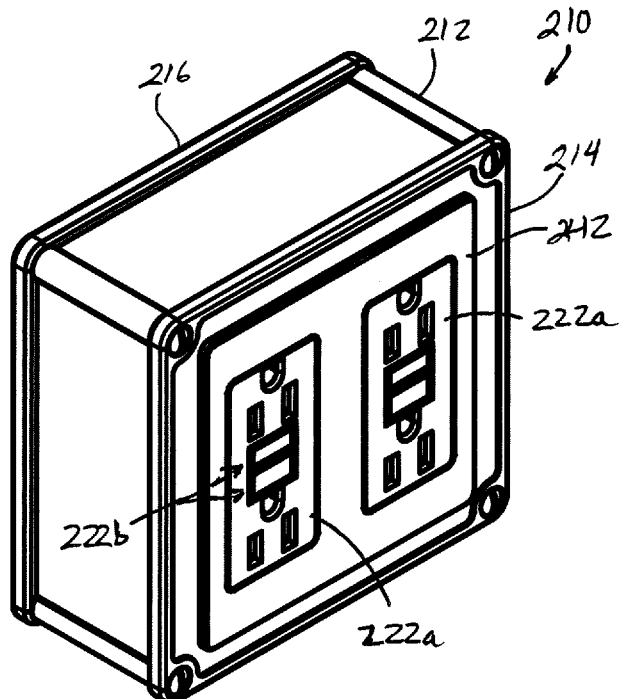
FIGS. 3A and 3B are perspective view of additional electrical power and data units in accordance with the present invention.
Figure 4:
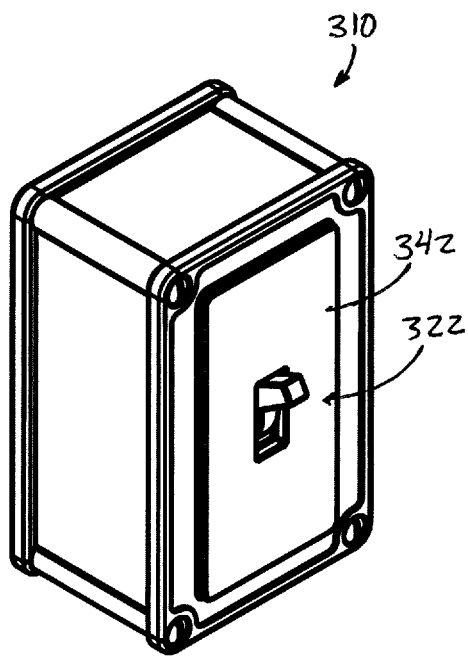
FIG. 4 is a perspective view of an electrical switch unit in accordance with the present invention.
Figure 3B:
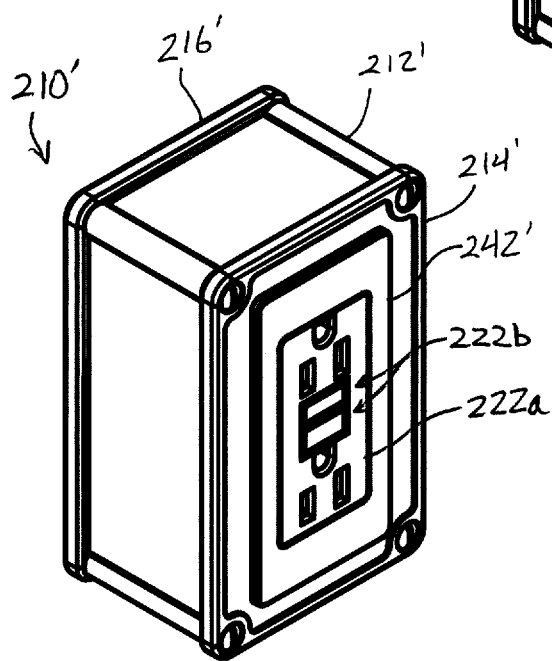

It will further be appreciated that the principles of the present invention may be applied to different styles of outlets and even different types of electrical components. For example, another electrical power and/or data unit 210 has a main housing 212 and front and rear covers 214, 216 that are sized and shaped to support two rectangular high voltage AC duplex electrical outlets 222a, such as shown in FIG. 3A. Optionally, a pair of low voltage DC outlets 222b are incorporated into the AC outlets 222a, as shown. The outlets 222a, 222b may be mounted in a separate subhousing 242 that is coupled to a frame-like cover plate 214 having an enlarged single opening to accommodate the subhousing 242, or the cover plate 214 may be formed with appropriately sized-openings for the outlets 222a. In the embodiment of FIG. 3B, another power and/or data unit 210' is substantially the same as the unit 210, but sized to accommodate a single high voltage AC duplex electrical outlet 222a at a correspondingly-sized subhousing 242' supported at the front cover 214'. Referring now to FIG. 4, another electrical power and/or data unit 310 is substantially identical to the unit 210' described above, but includes a subhousing 342 designed to accommodate an electrical switch 322

It is envisioned that main housings and the first and second covers may be made from metal, resinous plastic, fiber reinforced resin, wood, or substantially any suitable material. For example, to save cost while providing a constant cross-section and variable thickness or height, the main housing may be extruded from aluminum, resinous plastic, or fiber-reinforced plastic, and cut-to-length in a finishing operation. The main housings could also be molded or machined from blocks of solid or partially hollowed-out material, as desired. The first and second covers may be die-cast or machined from a block of material, and may be formed with the desired openings (if any) or later machined or stamped or otherwise formed to the desired final configuration.

Accordingly, the power and/or data units of the present invention can be readily adapted to many different purposes and applications while using parts that are interchangeable or readily adaptable to different applications, as desired. For example, a unit that is configured to support both high voltage AC outlets and low voltage DC outlets may have only one or two parts that differ from a comparable unit that is configured to support an electrical switch or electronic data jacks. This adaptability reduces manufacturing costs and also facilitates reconfiguring or repurposing a unit for a different application, as desired.

Changes and modifications in the specifically-described embodiments may be carried out without departing from the principles of the present invention, which is intended to be limited only by the scope of the appended claims as interpreted according to the principles of patent law including the doctrine of equivalents.

The embodiments of the invention in which an exclusive property or privilege is claimed are defined as follows:

1. An electrical power and/or electronic data unit, comprising:
   a main housing including at least one sidewall defining an internal volume and having an open first end and an open second end opposite said open first end;
   a first cover plate removably and directly coupled to said main housing at said open first end;
   a second cover plate directly coupled to said main housing at said open second end;
   a first opening defined in said first cover plate; and
   an electrical component secured in said first opening via engagement of outer surfaces of said electrical component with surfaces of said first cover plate that define said first opening;
   wherein said main housing comprises a constant cross section extending between said open first and second ends.

2. The electrical power and/or electronic data unit of claim 1, wherein said first cover plate defines a second opening, and said electrical power and/or data unit comprises a second electrical component mounted in said second opening.

3. The electrical power and/or electronic data unit of claim 1, wherein said second cover plate is removably coupled to said main housing and defines a second opening, and wherein said electrical power and/or data unit comprises a second electrical component mounted in said second opening.

4. The electrical power and/or electronic data unit of claim 3, wherein said first and second electrical components face in opposite directions.

5. The electrical power and/or electronic data unit of claim 1, wherein said electrical component extends through said open first end and into said internal volume defined by said at least one sidewall.

6. The electrical power and/or electronic data unit of claim 5, wherein said main housing comprises four of said sidewalls in a rectangular arrangement, said sidewalls cooperating with said first and second cover plates to define said internal volume in a rectangular shape.

7. The electrical power and/or electronic data unit of claim 6, wherein said main housing defines a threaded bore at each of four corners adjacent each of said open first and second ends, wherein each of said first and second cover plates has a rectangular shape generally corresponding to a rectangular shape of said main housing, and wherein each of said first and second cover plates defines a bore at each of four corners thereof, said electrical power and/or data unit further comprising a threaded fastener securing each of said four corners of each of said first and second cover plates to said main housing at corresponding ones of said threaded bores.

8. The electrical power and/or electronic data unit of claim 1, wherein said first opening is configured to receive and support a high voltage AC electrical outlet or a low voltage DC electrical outlet.

9. The electrical power and/or electronic data unit of claim 1, wherein said electrical component comprises at least one chosen from a high voltage AC electrical outlet, a low voltage DC electrical outlet, and an electrical switch.

10. An electrical power and/or electronic data unit, comprising:
    a main housing having an open first end and an open second end opposite said open first end, and a substantially constant cross section extending between said first and second open ends;
    said main housing comprising four sidewalls in a rectangular arrangement and four enlarged corner elements coupling said sidewalls together to define an internal volume;
    each of said corner elements comprising first and second opposite ends adjacent said first and second open ends of said main housing, respectively;
    a first plurality of mechanical connection elements at respective ones of said first ends of said corner elements and a second plurality of mechanical connection elements at respective ones of said second ends of said corner elements;
    a first cover plate removably coupled to said main housing at said a first plurality of mechanical connection elements, said first cover plate defining a first opening configured to receive an electrical component; and a second cover plate coupled to said main housing at said second plurality of mechanical connection elements.

11. The electrical power and/or electronic data unit of claim 10, wherein said first and second pluralities of mechanical connection elements comprise threaded bores formed at said first and second opposite ends of said corner elements.

12. The electrical power and/or electronic data unit of claim 11, wherein said corner elements are cylindrical in shape.

13. The electrical power and/or electronic data unit of claim 12, wherein each of said four sidewalls is planar and has a first thickness, and each of said four corner elements has a diameter that is greater than the first thickness.

14. The electrical power and/or electronic data unit of claim 10, wherein said first cover plate defines a second opening, and said electrical power and/or data unit comprises a second electrical component mounted in said second opening.

15. The electrical power and/or electronic data unit of claim 10, wherein said second cover plate is removably coupled to said main housing and defines a second opening, and wherein said electrical power and/or data unit comprises a second electrical component mounted in said second opening.

16. The electrical power and/or electronic data unit of claim 15, wherein said first and second electrical components face in opposite directions.

17. The electrical power and/or electronic data unit of claim 10, wherein said first opening is configured to receive and support a high voltage AC electrical outlet or a low voltage DC electrical outlet.

18. The electrical power and/or electronic data unit of claim 10, comprising said electrical component, wherein said electrical component comprises at least one chosen from a high voltage AC electrical outlet, a low voltage DC electrical outlet, and an electrical switch.

19. The electrical power and/or electronic data unit of claim 15, wherein said first and second cover plates are both directly and independently coupled to said main housing, and wherein said electrical component extends through said open first end and into said internal volume defined by said at least one sidewall, and wherein said second electrical component extends through said open second end and into said internal volume defined by said at least one sidewall.

20. The electrical power and/or electronic data unit of claim 3, wherein said electrical component extends through said open first end and into said internal volume defined by said at least one sidewall, and wherein said second electrical component extends through said open second end and into said internal volume defined by said at least one sidewall.

* * * * *